US012046401B2

(12) United States Patent
Matsuura et al.

(10) Patent No.: US 12,046,401 B2
(45) Date of Patent: Jul. 23, 2024

(54) COIL COMPONENT

(71) Applicant: Murata Manufacturing Co., Ltd., Kyoto-fu (JP)

(72) Inventors: Kouhei Matsuura, Nagaokakyo (JP); Morihiro Hamano, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 413 days.

(21) Appl. No.: 17/084,369

(22) Filed: Oct. 29, 2020

(65) Prior Publication Data

US 2021/0166854 A1 Jun. 3, 2021

(30) Foreign Application Priority Data

Nov. 29, 2019 (JP) ................................ 2019-216837

(51) Int. Cl.

| | |
|---|---|
| ***H01F 17/00*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ......... *H01F 17/0013* (2013.01); *H01F 27/29* (2013.01); *H01F 27/323* (2013.01); *H01F 41/043* (2013.01); *H01F 2017/0093* (2013.01)

(58) Field of Classification Search

CPC .... H01F 17/0013; H01F 27/29; H01F 27/323; H01F 41/043; H01F 2017/0093

See application file for complete search history.

(56) References Cited

U.S. PATENT DOCUMENTS

| | | | | |
|---|---|---|---|---|
| 8,547,682 B2 * | 10/2013 | Sasabayashi | H01G 4/012 | 361/306.3 |
| 2004/0207488 A1 * | 10/2004 | Kono | H03H 1/0007 | 333/185 |
| 2005/0181684 A1 * | 8/2005 | Ito | H05K 3/3442 | 439/894 |
| 2007/0211410 A1 * | 9/2007 | Togashi | H01G 4/30 | 361/321.2 |
| 2007/0217123 A1 * | 9/2007 | Togashi | H05K 3/3442 | 361/309 |
| 2013/0314194 A1 * | 11/2013 | Sato | H01F 17/0013 | 336/200 |
| 2020/0027651 A1 * | 1/2020 | Chen | H01F 27/24 | |
| 2021/0125783 A1 * | 4/2021 | Onodera | H01G 4/232 | |

FOREIGN PATENT DOCUMENTS

| | | | | |
|---|---|---|---|---|
| JP | 2004259991 A * | 9/2004 | | |
| JP | 2017011103 A | 1/2017 | | |
| WO | WO-2018100863 A1 * | 6/2018 | C03C 8/14 | |

* cited by examiner

*Primary Examiner* — Malcolm Barnes

(74) *Attorney, Agent, or Firm* — Studebaker & Brackett PC

(57) ABSTRACT

A coil component includes an element body including a first glass layer, a first ferrite layer formed on a first main surface of the first glass layer, and a second ferrite layer formed on a second main surface of the first glass layer; a coil buried in the first glass layer; and an outer electrode disposed on a side surface of the element body so as to span the first ferrite layer, the first glass layer, and the second ferrite layer. On the side surface of the element body, the width of the outer electrode in the ferrite layer regions is larger than the width of the outer electrode in the glass layer region in plan view in the direction perpendicular to the side surface.

8 Claims, 6 Drawing Sheets

COIL COMPONENT

CROSS-REFERENCE TO RELATED APPLICATIONS

This application claims benefit of priority to Japanese Patent Application No. 2019-216837, filed Nov. 29, 2019, the entire content of which is incorporated herein by reference.

BACKGROUND

Technical Field

The present disclosure relates to a coil component.

Background Art

A coil component known in the related art is a common mode choke coil disclosed in Japanese Unexamined Patent Application Publication No. 2017-11103. The common mode choke coil includes a first non-magnetic portion, a first magnetic portion formed on a lower surface of the first non-magnetic portion, a second magnetic portion formed on an upper surface of the first non-magnetic portion, a first coil and a second coil made of Ag and buried in the first non-magnetic portion, and a second non-magnetic portion formed on at least one of the lower surface of the first magnetic portion and the upper surface of the second magnetic portion. In the common mode choke coil, the outer electrode includes, in sequence, a nickel plating layer and a tin plating layer, or a solder plating layer or the like on a base electrode containing Ag. In the case of such a structure, the electrochemical migration of Ag contained in the base electrode may result in low reliability.

SUMMARY

Accordingly, the present disclosure provides a reliable coil component.

The present disclosure includes the following aspects.

[1] According to preferred embodiments of the present disclosure, a coil component includes an element body including a first glass layer, a first ferrite layer formed on a first main surface of the first glass layer, and a second ferrite layer formed on a second main surface of the first glass layer; a coil buried in the first glass layer; and an outer electrode disposed on a side surface of the element body so as to span the first ferrite layer, the first glass layer, and the second ferrite layer. On the side surface of the element body, the width of the outer electrode in ferrite layer regions is larger than the width of the outer electrode in a glass layer region in plan view in a direction perpendicular to the side surface.

[2] In the coil component according to [1], the difference between the width of the outer electrode in the ferrite layer regions and the width of the outer electrode in the glass layer region is 60 μm or more and 160 μm or less (i.e., from 60 μm to 160 μm).

[3] In the coil component according to [1] or [2], the outer electrode includes a base electrode containing Ag and a plating layer formed on the base electrode, and the width of the plating layer is larger than the width of the base electrode in plan view in the direction perpendicular to the side surface of the element body.

[4] In the coil component according any one of [1] to [3], the glass layer contains at least one filler selected from quartz and alumina.

[5] In the coil component according any one of [1] to [4], the coil component is a common mode choke coil in which a first coil and a second coil are buried in the first glass layer.

According to preferred embodiments of the present disclosure, a reliable coil component can be provided.

Other features, elements, characteristics and advantages of the present disclosure will become more apparent from the following detailed description of preferred embodiments of the present disclosure with reference to the attached drawings.

DETAILED DESCRIPTION

Figure 1:
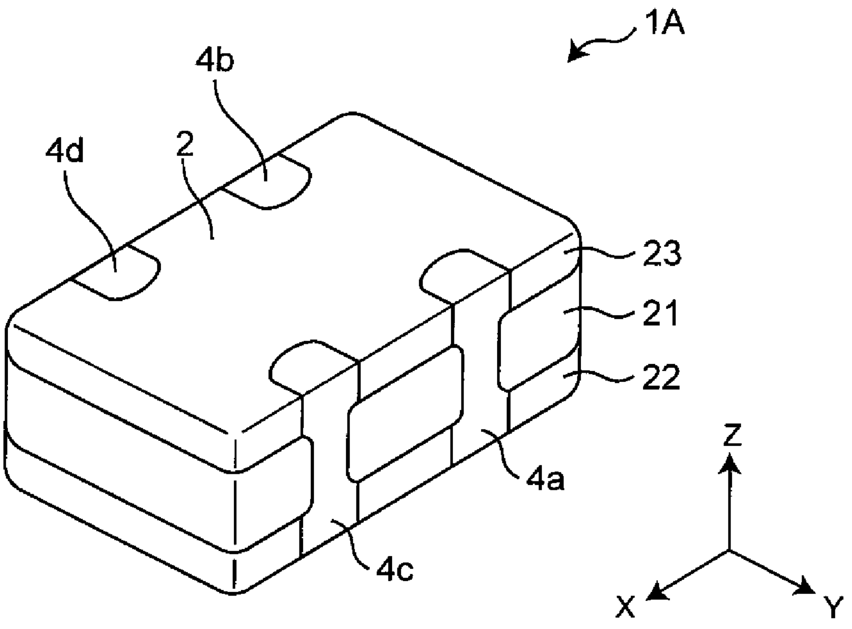
FIG. 1 is a perspective view of a coil component according to a first embodiment of the present disclosure.

The coil component according to the present disclosure will be described below in more detail with reference to embodiments illustrated in the drawings. The shape, arrangement, and the like of the coil component and each element according to the present disclosure are not limited to those in the embodiments described below and the configurations shown in the drawings.

First Embodiment

Figure 2:
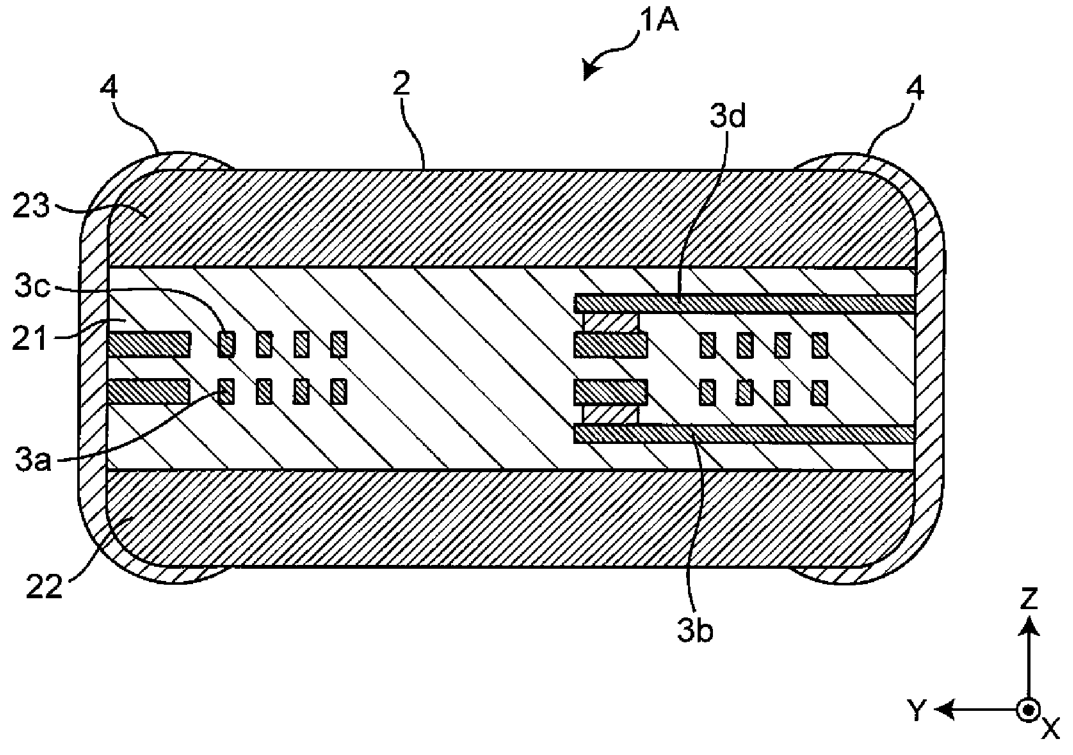
FIG. 2 is a YZ cross-sectional view of the coil component according to the first embodiment.
Figure 3:
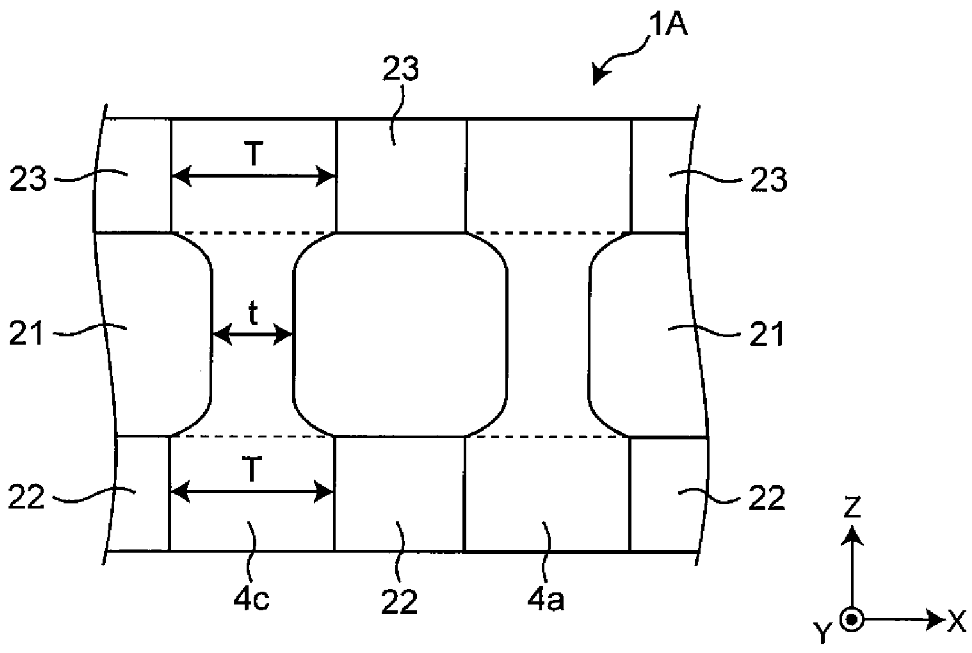
FIG. 3 is a partial side view of the coil component according to the first embodiment.
Figure 4:
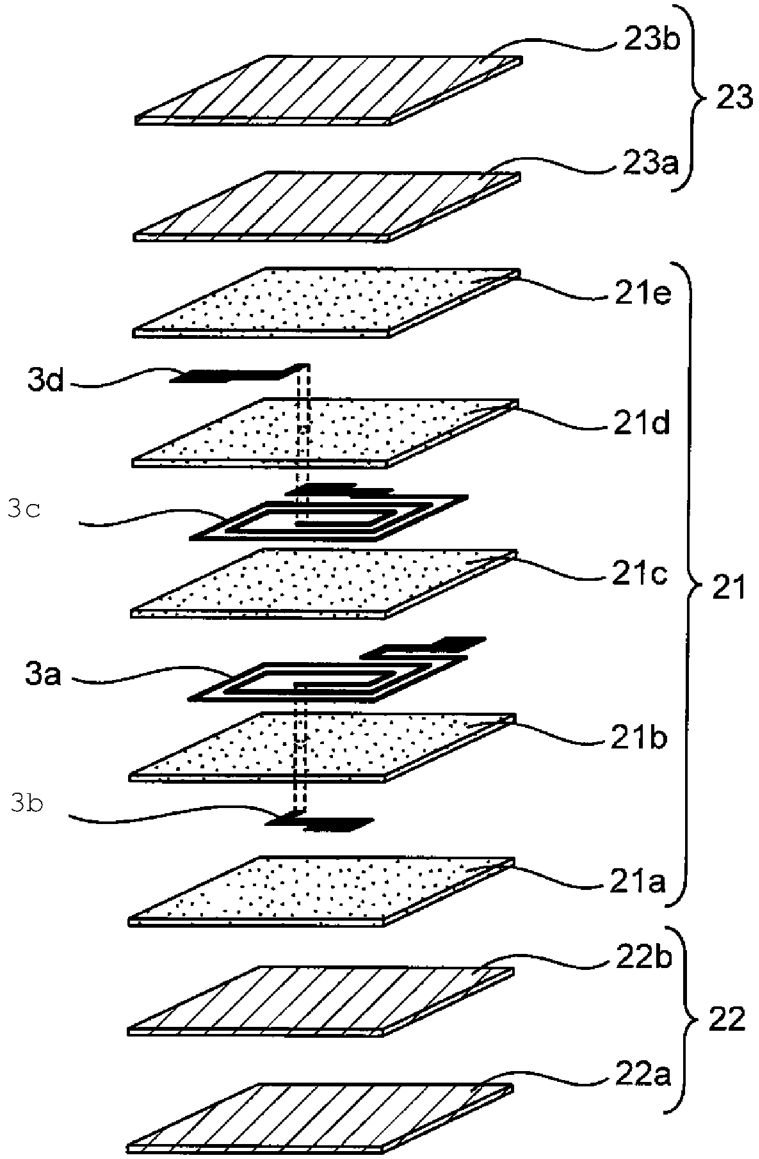
FIG. 4 is an exploded perspective view of the coil component according to the first embodiment.

FIG. 1 is a perspective view of a coil component 1A according to a first embodiment of the present disclosure. FIG. 2 is a YZ cross-sectional view of the coil component 1A. FIG. 3 is a partial end view of the coil component 1A. FIG. 4 is an exploded perspective view of the coil component 1A (excluding outer electrodes).

As illustrated in FIG. 1 to FIG. 4, the coil component 1A is what is called a common mode choke coil. The coil component 1A includes an element body 2, a coil (including a first coil 3*a* and a second coil 3*c* illustrated in FIG. 2) disposed inside the element body 2, and an outer electrode (including outer electrodes 4*a*, 4*b*, 4*c*, and 4*d*) disposed on the surface of the element body 2. The element body 2 includes a first glass layer 21, a first ferrite layer 22 formed on a first main surface of the first glass layer 21, and a second ferrite layer 23 formed on a second main surface of the first glass layer 21 (the first ferrite layer and the second ferrite layer are also collectively referred to as "ferrite layers"). The first coil 3*a* and the second coil 3*c* are disposed inside the first glass layer 21. The outer electrodes 4*a*, 4*b*, 4*c*, and 4*d* are disposed on the side surface of the element body 2 so as to extend from the upper end to the lower end of the element body 2 and span the second ferrite layer 23, the first glass layer 21, and the first ferrite layer 22.

As described above, the element body 2 includes the first glass layer 21, the first ferrite layer 22 formed on the first main surface of the first glass layer 21, and the second ferrite layer 23 formed on the second main surface of the first glass layer 21. In other words, the element body 2 includes the first glass layer 21, and the first ferrite layer 22 and the second ferrite layer 23 between which the first glass layer 21 is sandwiched from above and below.

The element body 2 has a substantially rectangular parallelepiped shape. The element body 2 may have round corners. The stacking direction of the element body 2 is defined as the Z-axis direction, the direction along the long sides of the element body 2 as the X-axis direction, and the direction along the short sides of the element body 2 as the Y-axis direction. The X-axis, the Y-axis, and the Z-axis are perpendicular to each other. The upward direction in the figures is the positive Z-axis direction, and the downward direction in the figures is the negative Z-axis direction.

The glass material of the first glass layer 21 may be, for example, a glass material containing at least K, B, and Si. The glass material may contain other elements in addition to K, B, and Si and may contain, for example, Al, Bi, Li, Ca, and Zn.

In one aspect, the glass material may be $SiO_2$—$B_2O_3$—$K_2O$ glass or $SiO_2$—$B_2O_3$—$K_2O$—$Al_2O_3$ glass containing 0.5 mass % or more and 5 mass % or less (i.e., from 0.5 mass % to 5 mass %) of K in terms of $K_2O$, 10 mass % or more and 25 mass % or less (i.e., from 10 mass % to 25 mass %) of B in terms of $B_2O_3$, 70 mass % or more and 85 mass % or less (i.e., from 70 mass % to 85 mass %) of Si in terms of $SiO_2$, and 0 mass % or more and 5 mass % or less (i.e., from 0 mass % to 5 mass %) of Al in terms of $Al_2O_3$.

The first glass layer 21 may contain a filler in addition to the glass material. The amount of the filler in the glass layer is, for example, 0 mass % or more and 40 mass % or less (i.e., from 0 mass % to 40 mass %), preferably 0.5 mass % or more and 40 mass % or less (i.e., from 0.5 mass % to 40 mass %), and may be, for example, 10 mass % or more, 20 mass % or more, 30 mass % or more, or 34 mass % or more, and 40 mass % or less or 38 mass % or less.

Examples of the filler include quartz ($Si_2O_3$) and alumina ($Al_2O_3$).

In a preferred aspect, the first glass layer 21 may contain 60 mass % or more and 66 mass % or less (i.e., from 60 mass % to 66 mass %) of the glass material, 34 mass % or more and 37 mass % or less (i.e., from 34 mass % to 37 mass %) of $Si_2O_3$, and 0.5 mass % or more and 4 mass % or less (i.e., from 0.5 mass % to 4 mass %) of $Al_2O_3$, relative to the entire glass layer.

The thickness of the first glass layer 21 may be, for example, 20 μm or more and 300 μm or less (i.e., from 20 μm to 300 μm), and preferably 30 μm or more and 200 μm or less (i.e., from 30 μm to 200 μm).

The ferrite material of the first ferrite layer 22 may be the same as or different from the ferrite material of the second ferrite layer 23. In a preferred aspect, the ferrite material of the first ferrite layer 22 is the same as the ferrite material of the second ferrite layer 23.

The ferrite material may be a ferrite material containing Fe, Zn, Cu, and Ni as main components. The ferrite material may further contain trace amounts of additives (including unavoidable impurities) in addition to the main components.

In the ferrite material, the Fe content in terms of $Fe_2O_3$ may be 40.0 mol % or more and 49.5 mol % or less (i.e., from 40.0 mol % to 49.5 mol %) (based on the total amount of main components, the same applies hereinafter), and preferably 45.0 mol % or more and 48.0 mol % or less (i.e., from 45.0 mol % to 48.0 mol %).

In the ferrite material, the Zn content in terms of ZnO may be 5.0 mol % or more and 35.0 mol % or less (i.e., from 5.0 mol % to 35.0 mol %) (based on the total amount of main components, the same applies hereinafter), and preferably 10.0 mol % or more and 30.0 mol % or less (i.e., from 10.0 mol % to 30.0 mol %).

In the ferrite material, the Cu content in terms of CuO may be 4.0 mol % or more and 12.0 mol % or less (i.e., from 4.0 mol % to 12.0 mol %) (based on the total amount of main components, the same applies hereinafter), and preferably 7.0 mol % or more and 10.0 mol % or less (i.e., from 7.0 mol % to 10.0 mol %).

In the ferrite material, the Ni content is not limited and may be the residue that remains after removal of Fe, Zn, and Cu, which are other main components described above. The Ni content may be, for example, 9.0 mol % or more and 45.0 mol % or less (i.e., from 9.0 mol % to 45.0 mol %).

Examples of the additives include, but are not limited to, Bi, Sn, Mn, Co, and Si. The amounts (addition amounts) of Bi, Sn, Mn, Co, and Si in terms of $Bi_2O_3$, $SnO_2$, $Mn_3O_4$, $Co_3O_4$, and $SiO_2$ are each preferably 0.1 parts by mass or more and 1 part by mass or less (i.e., from 0.1 parts by mass to 1 part by mass) relative to 100 parts by mass of the total amount of main components (Fe (in terms of $Fe_2O_3$), Zn (in terms of ZnO), Cu (in terms of CuO), and Ni (in terms of NiO).

The coil component 1A includes a coil as an inner conductor. The coil component 1A illustrated in FIG. 2 includes two coils: the first coil 3*a* and the second coil 3*c*. The coil component according to the present disclosure does not necessarily include two coils, and may include only one coil or may include three or more coils.

The coil including the first coil 3*a* and the second coil 3*c* is disposed inside the first glass layer 21 of the element body 2. The first coil 3*a* and the second coil 3*c* are arranged in sequence in the stacking direction of the element body to form a common mode choke coil. The coil including the first coil 3*a* and the second coil 3*c* is formed of, for example, a conductive material, such as Ag or Cu. The conductive material is preferably Ag.

The first coil 3*a* and the second coil 3*c* each have a spiral pattern wound spirally in the same direction as seen from above. The coil including the first coil 3*a* and the second coil 3*c* has, at both ends, extended portions extended to the surfaces of the element body 2 and connected to the respective outer electrodes. Specifically, one end of the first coil 3*a* on the outer circumferential side of the spiral has an extended portion extended to the surface of the element body 2, and the other end of the first coil 3*a* at the center of the spiral has a pad portion. The pad portion of the first coil 3*a* is electrically connected to the other extended portion (indicated by reference character 3*b* in FIG. 2) via a via conductor disposed inside the first glass layer 21. The extended portion 3*b* is extended to the surface of the element body 2. Similarly, one end of the second coil 3*c* on the outer circumferential side of the spiral has an extended portion extended to the surface of the element body 2, and the other end of the second coil 3*c* at the center of the spiral has a pad portion. The pad portion of the second coil 3*c* is electrically connected to the other extended portion (indicated by reference character 3*d* in FIG. 2) via a via conductor disposed inside the first glass layer 21. The extended portion 3*d* is extended to the surface of the element body 2.

The coil component 1A illustrated in FIG. 1 includes a first outer electrode 4*a*, a second outer electrode 4*b*, a third outer electrode 4*c*, and a fourth outer electrode 4*d*. The number of outer electrodes may change according to the number of inner conductors. The coil component may include only two (i.e., one pair) outer electrodes or may include three or more, for example, six (three pairs) or more outer electrodes.

Both ends of each coil are extended to the surfaces of the element body and connected to the respective outer electrodes. In the coil component 1A illustrated in FIG. 2, one end of the first coil 3*a* is extended to the surface of the element body 2 and connected to the first outer electrode 4*a*, and the other end is extended to the surface of the element body 2 and connected to the second outer electrode 4*b*. Similarly, one end of the second coil 3*c* is extended to the surface of the element body 2 and connected to the third outer electrode 4*c*, and the other end is extended to the surface of the element body 2 and connected to the fourth outer electrode 4*d*.

Each outer electrode is present on the surface of the element body 2 so as to span the first ferrite layer 22, the first glass layer 21, and the second ferrite layer 23. In the coil component 1 illustrated in FIG. 1, the first outer electrode 4*a* and the third outer electrode 4*c* are formed on one side surface parallel to the XZ-plane of the element body 2. The second outer electrode 4*b* and the fourth outer electrode 4*d* are formed on a side surface opposite to the side surface on which the first outer electrode 4*a* and the third outer electrode 4*c* are formed. The first to fourth outer electrodes 4*a* to 4*d* may extend to the top and bottom of the element body 2 so as to form a U-shape as illustrated in FIG. 1.

The width of at least one of the outer electrodes in the regions of the first ferrite layer 22 and the second ferrite layer 23 is larger than that in the region of the first glass layer 21. In the coil component 1A illustrated in FIG. 1, the width of each of the first outer electrode 4*a*, the second outer electrode 4*b*, the third outer electrode 4*c*, and the fourth outer electrode 4*d* in the regions of the first ferrite layer 22 and the second ferrite layer 23 is larger than that in the region of the first glass layer 21. When the width of at least one outer electrode, preferably the width of all outer electrodes, is larger on the ferrite layers, the coil component has high reliability. In particular, when metals that easily cause electrochemical migration, such as Ag, are used for base electrodes, electrochemical migration occurs more easily on the ferrite layers than on the glass layer, which results in low reliability. The electrochemical migration can be effectively suppressed by widely covering, with plating, the base electrodes on the ferrite layers on which electrochemical migration easily occurs.

The "width" of an outer electrode as used herein refers to the width of the outer electrode in the direction (X direction) perpendicular to the stacking direction of the element body 2 and parallel to the surface of the element body 2 on which the outer electrode is disposed. In other words, in FIG. 3, T represents the width of an outer electrode in the regions of the first ferrite layer 22 and the second ferrite layer 23, and t represents the width of the outer electrode in the region of the first glass layer 21. The width of the outer electrode in each region is the average width of the outer electrode in the region.

The difference between the width T of one outer electrode in the ferrite layer regions and the width t of the outer electrode in the glass layer region may be preferably 60 μm or more and more preferably 80 μm or more. When the difference between the width T and the width t is 60 μm or more, the reduction in reliability caused by electrochemical migration can be suppressed. The difference between the width T of the outer electrode in the ferrite layer regions and the width t of the outer electrode in the glass layer region may be preferably 180 μm or less and more preferably 160 μm or less. When the difference between the width T and the width t is 180 μm or less, the reduction in insulation reliability between outer electrode terminals can be suppressed. In a preferred aspect, the difference between the width T of the outer electrode in the ferrite layer regions and the width t of the outer electrode in the glass layer region may be preferably 60 μm or more and 180 μm or less (i.e., from 60 μm to 180 μm), and more preferably 80 μm or more and 160 μm or less (i.e., from 80 μm to 160 μm).

The material of the outer electrodes may be, for example, a conductive material containing a metal, such as Ag, Pd, Cu, Ni, or Sn, or an alloy thereof. The material of the outer electrodes preferably contains Ag or an Ag-containing alloy, and more preferably contains Ag.

Figure 5:
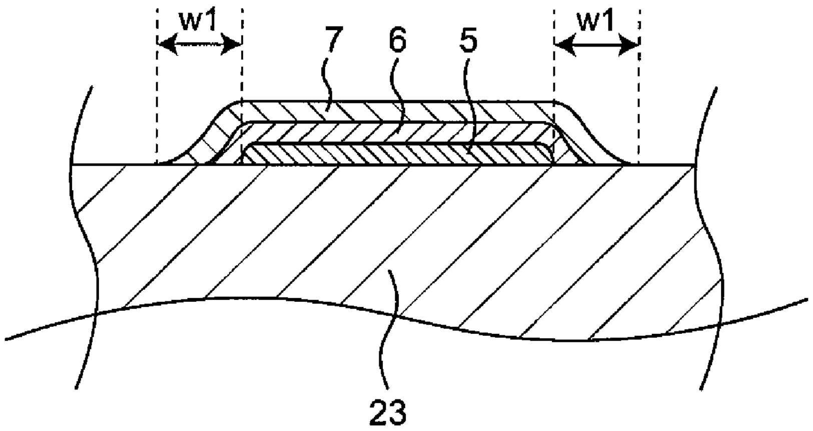
FIG. 5 is a cross-sectional view of an outer electrode of the coil component according to the first embodiment.

In one aspect, the outer electrodes each include a base electrode and a plating layer formed on the base electrode. The plating layer may be formed of one layer or two or more layers. In a preferred aspect, as illustrated in FIG. 5, a plating layer 8 is disposed to cover a base electrode 5 in at least the ferrite layer region in plan view in the direction perpendicular to the side surface of the element body 2.

The distance W1 from an end of the plating layer 8 to an end of the base electrode 5 is preferably 10 μm or more, and more preferably 20 μm or more. As the distance W1 is longer, the reduction in reliability caused by electrochemical migration can be more suppressed. The distance W1 from the end of the plating layer to the end of the base electrode is preferably 40 μm or less, and more preferably 30 μm or less. As the distance W1 is shorter, the time for forming the outer electrode can be shorter. In a preferred aspect, the distance W1 from the end of the plating layer to the end of the base electrode is preferably 10 μm or more and 40 μm or less (i.e., from 10 μm to 40 μm), and more preferably 20 μm or more and 30 μm or less (i.e., from 20 μm to 30 μm).

In a preferred aspect, the base electrode 5 is a base electrode containing Ag or Cu, and preferably a base electrode containing Ag. In a preferred aspect, the plating layer 8 may include one or both of a Ni-plating layer 6 and a Sn-plating layer 7, and may preferably include both of the Ni-plating layer 6 and the Sn-plating layer 7. In a preferred aspect, the outer electrode includes a base electrode 5 containing Ag, the Ni-plating layer 6 formed on the base electrode 5, and the Sn-plating layer 7 formed on the Ni-plating layer 6. In one aspect, a Ni—Sn alloy may be formed at the boundary between the Ni-plating layer 6 and the Sn-plating layer 7. The disposition of the Sn-plating layer 7 on the Ni-plating layer 6 can improve the working efficiency of subsequent soldering of electronic components.

In a preferred aspect, the width of the plating layer in the ferrite layer regions is larger than the width of the base electrode in plan view in the direction perpendicular to the side surface of the element body. In particular, the distance W1 from the end of the plating layer to the end of the base electrode is preferably 10 μm or more and 40 μm or less (i.e., from 10 μm to 40 μm), and more preferably 20 μm or more and 30 μm or less (i.e., from 20 μm to 30 μm).

The thickness of the base electrode 5 may be preferably 1 μm or more and 200 μm or less (i.e., from 1 μm to 200 μm), more preferably 5 μm or more and 100 μm or less (i.e., from 5 μm to 100 μm), and more preferably 10 μm or more and 50 μm or less (i.e., from 10 μm to 50 μm). When the thickness of the base electrode 5 is 1 μm or more, a strong electrical connection can be established between the base electrode 5 and each coil in the element body 2. When the thickness of the base electrode 5 is 200 μm or less, it is easy to integrate the base electrode 5 into a small electronic component.

When the plating layer includes the Ni-plating layer and the Sn-plating layer, the thickness of the Ni-plating layer 6 may be preferably, but not necessarily, 0.5 μm or more and 6 μm or less (i.e., from 0.5 μm to 6 μm), more preferably 1 μm or more and 5 μm or less (i.e., from 1 μm to 5 μm), still more preferably 2 μm or more and 4 μm or less (i.e., from 2 μm to 4 μm), and yet still more preferably 3 μm or more and 3.5 μm or less (i.e., from 3 μm to 3.5 μm). When the thickness of the Ni-plating layer 6 is 0.5 μm or more, the outer electrode can successfully exhibit high corrosion resistance and the like. When the thickness of the Ni-plating layer 6 is 6 μm or less, it is easy to integrate the Ni-plating layer 6 into a small electronic component.

When the plating layer includes the Ni-plating layer and the Sn-plating layer, the thickness of the Sn-plating layer 7 may be preferably, but not necessarily, 1 μm or more and 10 μm or less (i.e., from 1 μm to 10 μm), more preferably 1 μm or more and 8 μm or less (i.e., from 1 μm to 8 μm), still more preferably 2 μm or more and 5 μm or less (i.e., from 2 μm to 5 μm), and yet still more preferably 3 μm or more and 4 μm or less (i.e., from 3 μm to 4 μm). When the thickness of the Sn-plating layer 7 is 1 μm or more, the leaching of the plating layer located below the Sn-plating layer 7 can be prevented during subsequent soldering, and it is easy to successfully perform soldering. When the thickness of the Sn-plating layer 7 is 10 μm or less, the outer electrode has a suitable total thickness, and it is easy to integrate the outer electrode into a small electronic component.

The thickness (total thickness for multiple layers) of the plating layer may be preferably 1 μm or more and 20 μm or less (i.e., from 1 μm to 20 μm), more preferably 2 μm or more and 15 μm or less (i.e., from 2 μm to 15 μm), and still more preferably 3 μm or more and 10 μm or less (i.e., from 3 μm to 10 μm). When the thickness of the plating layer is 1 μm or more, the electrochemical migration resistance effect can be exhibited successfully. When the thickness of the plating layer is 20 μm or less, it is easy to integrate the plating layer into a small electronic component.

In the coil component according to the present disclosure, multiple outer electrodes may be present adjacent to each other on one surface of the element body. In the coil component 1A illustrated in FIG. 1, the first outer electrode 4*a* and the third outer electrode 4*c* are present adjacent to each other on one side surface of the element body 2. The second outer electrode 4*b* and the fourth outer electrode 4*d* are present adjacent to each other on a side surface of the element body 2 opposite to the side surface on which the first outer electrode 4*a* and the third outer electrode 4*c* are disposed. When the width of the outer electrodes in the regions of the first ferrite layer 22 and the second ferrite layer 23 is larger than the width of the outer electrodes in the region of the first glass layer 21, the coil component may have high reliability. Since the width of the outer electrodes in the region of the first glass layer 21 is smaller than the width of the outer electrodes in the regions of the first ferrite layer 22 and the second ferrite layer 23, the distance between adjacent outer electrodes is long in the region of the first glass layer 21.

Next, a method for manufacturing the coil component 1A will be described.

First, glass sheets are produced. For example, first, $K_2O$, $B_2O_3$, $SiO_2$, and $Al_2O_3$ are provided as raw materials of a glass material. These raw materials are melted and rapidly cooled to provide a glass material. The obtained glass material is pulverized into powder and mixed with an organic binder, such as a polyvinyl butyral organic binder, an organic solvent, such as ethanol or toluene, a plasticizer, and the like. The resulting mixture is formed into sheets having a predetermined thickness, size, and shape by the doctor blade method or the like, whereby glass sheets are produced.

The particle size (D50: particle size at cumulative volume of 50%) of the glass material may be preferably 0.5 μm or more and 10 μm or less (i.e., from 0.5 μm to 10 μm), more preferably 1 μm or more and 5 μm or less (i.e., from 1 μm to 5 μm), and still more preferably 1 μm or more and 3 μm or less (i.e., from 1 μm to 3 μm).

The thickness of the glass sheet is not limited, and may be, for example, 10 μm or more and 40 μm or less (i.e., from 10 μm to 40 μm), and preferably 20 μm or more and 30 μm or less (i.e., from 20 μm to 30 μm). Separately, ferrite sheets are produced. For example, $Fe_2O_3$, NiO, ZnO, and CuO powders, and other optional additives are provided as raw materials of a ferrite material, and weighed so as to obtain a predetermined composition. The weighed materials are placed in a ball mill together with PSZ media, pure water, a dispersant, and the like, and wet-mixed and pulverized. The resulting powder is then dried and calcined at a temperature of, for example, 700° C. to 800° C. to provide a calcined powder. The obtained calcined power, an organic binder, such as a polyvinyl butyral organic binder, and an organic solvent, such as ethanol or toluene, are placed in a pot mill together with PSZ balls and mixed and pulverized. The resulting mixture is formed into sheets having a predetermined thickness, size, and shape by the doctor blade method or the like, whereby ferrite sheets are produced.

The thickness of the ferrite sheets is not limited, and may be, for example, 20 μm or more and 60 μm or less (i.e., from 20 μm to 60 μm), and preferably 35 μm or more and 45 μm or less (i.e., from 35 μm to 45 μm).

Next, a coil pattern is formed on the glass sheets. A conductive material, for example, a conductive paste containing Ag as a main component, is prepared. Next, the conductive paste is applied to the glass sheets having a via hole as desired, whereby the via hole is filled with the conductive paste, and extended electrodes and coil conductor patterns are formed.

The glass sheets are stacked in order as illustrated in FIG. 4, and a predetermined number of the ferrite sheets are stacked on and under the glass sheets. A multilayer body including the sheets stacked on top of one another is subjected to pressure bonding under high temperature and high pressure. For example, the multilayer body is subjected to pressure bonding by warm isostatic pressing (WIP) under the conditions of 80° C. and 100 MPa.

The obtained multilayer body is cut into individual pieces by using a dicer or the like. Next, the individual pieces of the multilayer body are fired to produce element bodies. As desired, the fired element bodies may be placed in a rotary barrel machine together with media and rotated so that the edges and corners of the element bodies may be rounded off.

Next, the conductive paste is applied to points on the side surfaces of each element body to which the coils are extended. The conductive paste is baked to form base electrodes. A Ni-plating layer and a Sn-plating layer are sequentially formed on the formed base electrodes by electrolytic plating.

Various methods can be used in order to make the width of the plating layer in the ferrite layer regions larger than the width of the plating layer in the glass layer regions on the side surfaces of the element body 2 in plan view in the direction perpendicular to the side surfaces. For example, the adjustment of plating conditions, such as plating time or current value, allows the plating layer on each ferrite layer to grow more and have a larger width than the plating layer on each glass layer. Since a ferrite layer normally has a low specific resistance than a glass layer, plating can grow more on a ferrite layer than on a glass layer for a long time of plating.

In one aspect, electrolytic plating is electrolytic Ni plating (hereinafter also referred to as Sn-ion-containing electrolytic Ni-plating) in which Ni ions are added to a plating liquid and Sn ions are added by any method. The method for adding Sn ions is not limited. For example, Sn ions and Ni ions are added by using commercial plating media having the outermost layer coated with Sn and a commercial electrolytic Ni plating liquid in electrolytic plating. In this method, for example, Sn preferentially deposits at low current, for example, lower than 20 A, preferably lower than 5 A, whereas Ni preferentially deposits at high current, for example, 20 A or higher, preferably 25 A or higher.

The coil component (common mode choke coil) according to this embodiment can be produced as described above.

Second Embodiment

Figure 6:
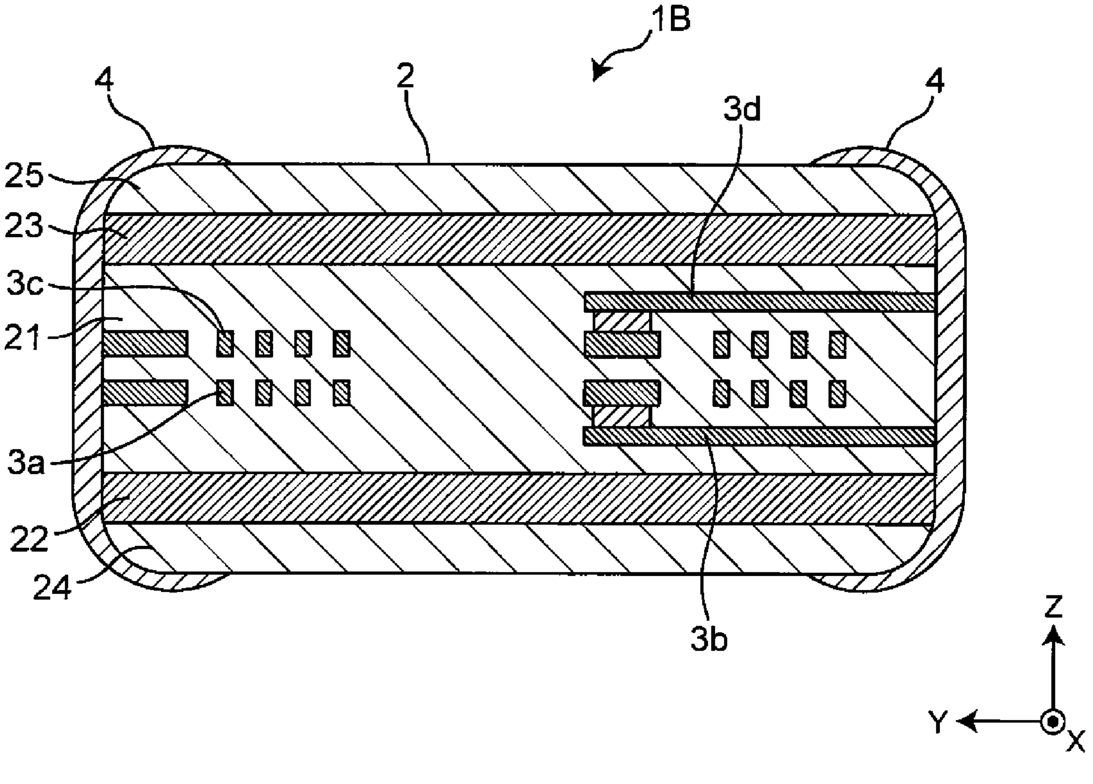
FIG. 6 is a YZ cross-sectional view of a coil component according to a second embodiment.
Figure 7:
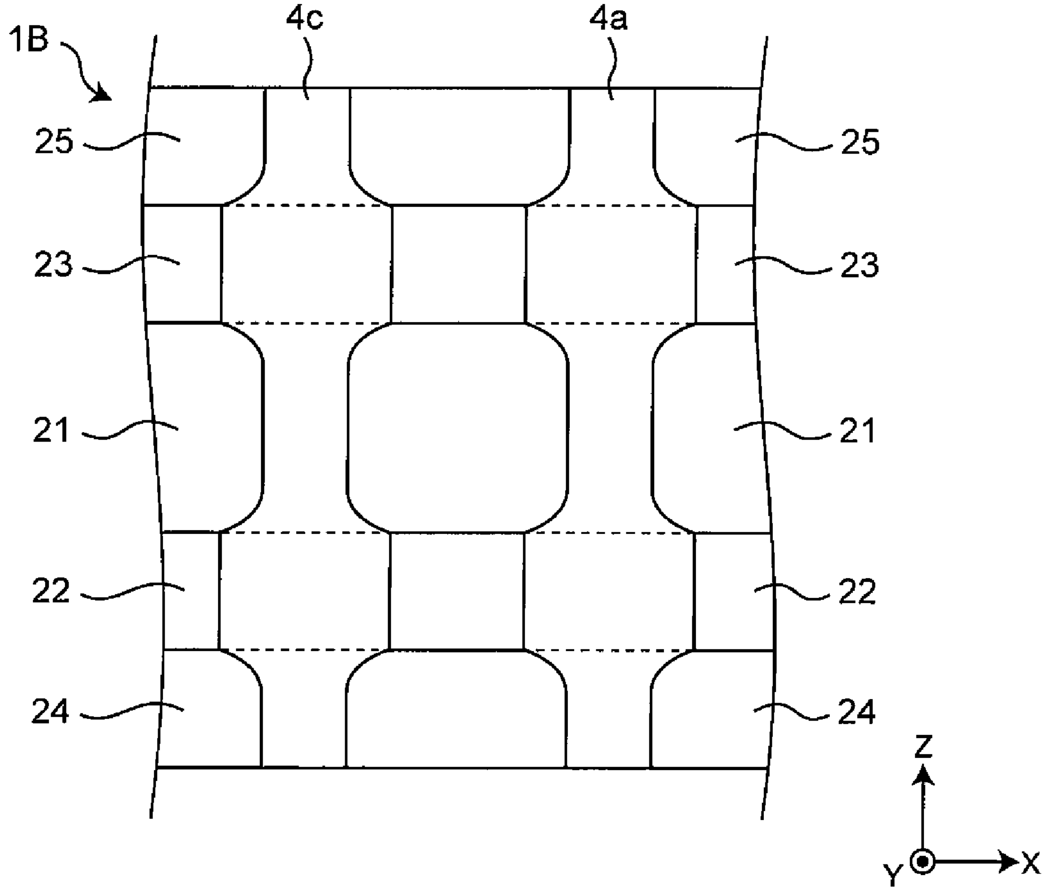
FIG. 7 is a partial side view of the coil component according to the second embodiment.

FIG. 6 is a YZ cross-sectional view of a coil component according to a second embodiment of the present disclosure. FIG. 7 is a partial end view of the coil component. The second embodiment is different from the first embodiment in that the element body 2 further includes a second glass layer 24 and a third glass layer 25. Only the different configuration will be described below. In the second embodiment, the same reference characters as those in the first embodiment represent the same elements as those in the first embodiment. The description of such elements is omitted.

In the coil component 1B according to the second embodiment, as illustrated in FIG. 6 and FIG. 7, the element body 2 may further include the second glass layer 24 stacked on the first ferrite layer 22, and the third glass layer 25 stacked on the second ferrite layer 23. In this case, each outer electrode is present on the surfaces of the second glass layer 24, the first ferrite layer 22, the first glass layer 21, the second ferrite layer 23, and the third glass layer 25. The second glass layer 24 and the third glass layer 25 preferably contain glass and/or a glass-ferrite composite material. When the outer electrodes contain glass and the second glass layer 24 and the third glass layer 25 contain glass and/or a glass-ferrite composite material, the interaction between the glass component contained in the outer electrodes and the glass component contained in the second glass layer 24 and the third glass layer 25 may further improve the adhesion strength between each outer electrode and the multilayer body.

The width of at least one outer electrode on the second glass layer 24 and the third glass layer 25 is preferably smaller than that on the first ferrite layer 22 and the second ferrite layer 23. When the width of at least one outer electrode on the second glass layer 24 and the third glass layer 25 is smaller, the distance between outer electrodes is large, which ensures insulation between the electrodes more assuredly.

The glass and/or the glass-ferrite composite material that may be contained in the second glass layer 24 and the third glass layer 25 may be the same as those that may be contained in the first glass layer 21. The second glass layer 24 and the third glass layer 25 may have the same composition as or a different composition from that of the first glass layer 21. The second glass layer 24 and the third glass layer 25 may have the same composition or different compositions from each other.

EXAMPLES

Production of Coil Component

Production of Glass Sheets

As raw materials of a glass material, $K_2O$, $B_2O_3$, $SiO_2$, and $Al_2O_3$ were provided and weighed such that the proportions of $K_2O$, $B_2O_3$, $SiO_2$, and $Al_2O_3$ were 2.0 mass %, 18.5 mass %, 79.0 mass %, and 0.5 mass %. These raw materials were placed in a platinum crucible and melted by heating to a temperature of 1550° C. in a firing furnace. The molten material was rapidly cooled to provide a glass material. The obtained glass material was pulverized to a D50 (particle size at cumulative volume of 50%) of about 2 μm to provide a glass powder.

An alumina powder and a quartz powder that have a D50 of 1.3 μm were provided and added to the obtained glass powder. These powders were placed in a ball mill together with PSZ media. A polyvinyl butyral organic binder, a mixed organic solvent of toluene and EKINEN, and a plasticizer were further added and mixed. Next, the resulting mixture was formed into a sheet having a film thickness of 25 μm by the doctor blade method or the like. The sheet was punched out into a rectangular shape 225 mm×225 mm to produce glass sheets.

Production of Ferrite Sheets Separately, $Fe_2O_3$, NiO, ZnO, and CuO powders were provided as raw materials of a ferrite material and weighed so as to obtain a composition of 45 mol % $Fe_2O_3$, 15 mol % NiO, 30 mol % ZnO, and 10 mol % CuO. The weighed materials were placed in a ball mill together with PSZ media, pure water, and a dispersant and wet-mixed and pulverized. The resulting powder was dried by evaporation and calcined at a temperature of 750° C. to provide a calcined powder.

The calcined power, a polyvinyl butyral organic binder, and a mixed organic solvent of toluene and EKINEN were placed in a pot mill together with PSZ balls and mixed and pulverized well. Next, the resulting mixture was formed into a sheet having a film thickness of 40 μm by the doctor blade method or the like. The sheet was punched out into a rectangular shape 225 mm×225 mm to produce ferrite sheets.

Production of Coil Pattern Separately, a conductive material, for example, a conductive paste containing Ag as a main component, was prepared. The glass sheets were each subjected to laser irradiation to form a via hole at a predetermined position. Next, the conductive paste was applied to the glass sheets by screen printing, whereby the via hole was filled with the conductive paste, and extended electrodes and coil conductor patterns were formed.

Production of Element Body

The glass sheets were stacked in order as illustrated in FIG. 4, and six ferrite sheets were stacked on the glass sheets and six ferrite sheets were stacked on the glass sheets. The multilayer body including the sheets stacked on top of one another was subjected to warm isostatic pressing (WIP) under the conditions of a temperature of 80° C. and a pressure of 100 MPa to provide a multilayer block.

The obtained multilayer block was cut into individual pieces by using a dicer or the like. Next, the individual pieces of the multilayer block were fired in a firing furnace at 880° C. for 1.5 hours to produce element bodies. The fired element bodies were placed in a rotary barrel machine together with media and rotated so that the edges and corners of the element bodies were rounded off.

Production of Outer Electrodes

After barreling, the Ag conductive paste was applied to four points on the side surfaces of each element body to which the coils were extended. The Ag conductive paste was baked under the conditions of 810° C. for one minute to form base electrodes of outer electrodes. The thickness of the base electrodes was 5 μm.

A Ni-coating film and a Sn-coating film were sequentially formed on the base electrodes by electrolytic plating. The thickness of the Ni-coating film and the thickness of the Sn-coating film were 3 μm and 3 μm, respectively.

The coil component (common mode choke coil) according to this embodiment was produced as described above.

Evaluation

Three types of samples were prepared by changing the plating time such that the difference between the width of the outer electrodes in the ferrite layer regions and the width of the outer electrodes in the glass layer regions was 60 μm (Example 1), 160 μm (Example 2), and 0 μm (Comparative Example). A DC of 10 V was applied between the terminals of the prepared samples (30 samples for each Example) for 500 hours at an environmental temperature of 60° C. and a relative humidity of 93% RH. Subsequently, each sample was observed with a digital microscope, and the number of samples in which the total electrochemical migration (total electrochemical migration between electrodes on the both sides) was 100 μm or greater was evaluated. The results are shown in Table 1 below.

TABLE 1

| | Number of Samples With 100 μm or Greater of Electrochemical Migration |
|---|---|
| Example 1 | 0/30 |
| Example 2 | 0/30 |
| Comparative Example 1 | 30/30 |

Since the coil component according to the present disclosure has high reliability, the coil component can be used in various electronic devices, such as personal computers, DVD players, digital cameras, TVs, cellular phones, and car electronics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

an element body including a first glass layer, a first ferrite layer disposed on a first main surface of the first glass layer, a second glass layer disposed on a surface of the first ferrite layer opposite the first glass layer, and a second ferrite layer disposed on a second main surface of the first glass layer;

a coil buried in the first glass layer; and an outer electrode disposed on a side surface of the element body so as to span the first ferrite layer, the first glass layer, and the second ferrite layer, wherein, on the side surface of the element body, a width of the outer electrode in ferrite layer regions is larger than a width of the outer electrode in a glass layer region in plan view in a direction perpendicular to the side surface, the glass layer contains at least one filler, wherein the at least one filler consists of at least one selected from the group consisting of quartz and alumina, and the second glass layer is exposed on one side of the coil component.

2. The coil component according to claim 1, wherein a difference between the width of the outer electrode in the ferrite layer regions and the width of the outer electrode in the glass layer region is from 60 μm to 160 μm.

3. The coil component according to claim 2, wherein the outer electrode includes a base electrode containing Ag and a plating layer disposed on the base electrode, and a width of the plating layer is larger than a width of the base electrode in plan view in the direction perpendicular to the side surface of the element body.

4. The coil component according to claim 3, wherein the coil component is a common mode choke coil in which a first coil and a second coil are buried in the first glass layer.

5. The coil component according to claim 2, wherein the coil component is a common mode choke coil in which a first coil and a second coil are buried in the first glass layer.

6. The coil component according to claim 1, wherein the outer electrode includes a base electrode containing Ag and a plating layer disposed on the base electrode, and a width of the plating layer is larger than a width of the base electrode in plan view in the direction perpendicular to the side surface of the element body.

7. The coil component according to claim 6, wherein the coil component is a common mode choke coil in which a first coil and a second coil are buried in the first glass layer.

8. The coil component according to claim 1, wherein the coil component is a common mode choke coil in which a first coil and a second coil are buried in the first glass layer.

* * * * *